United States Patent
Mao et al.

(10) Patent No.: US 9,444,302 B2
(45) Date of Patent: Sep. 13, 2016

(54) ROTARY ELECTRIC MACHINE

(71) Applicant: NIDEC SERVO CORPORATION, Kiryu, Gumma (JP)

(72) Inventors: Runxiang Mao, Kiryu (JP); Hiroyuki Tanaka, Kiryu (JP)

(73) Assignee: NIDEC SERVO CORPORATION, Gumma (JP)

( * ) Notice: Subject to any disclaimer, the term of this patent is extended or adjusted under 35 U.S.C. 154(b) by 541 days.

(21) Appl. No.: 13/948,393

(22) Filed: Jul. 23, 2013

(65) Prior Publication Data

US 2014/0035405 A1 Feb. 6, 2014

(30) Foreign Application Priority Data

Aug. 3, 2012 (JP) .................................. 2012-173394

(51) Int. Cl.
*H02K 5/10* (2006.01)
*H02K 5/22* (2006.01)
*H02G 3/22* (2006.01)

(52) U.S. Cl.
CPC ................ *H02K 5/10* (2013.01); *H02K 5/225* (2013.01); *H02G 3/22* (2013.01)

(58) Field of Classification Search
CPC ........... H02K 5/10; H02K 5/225; H02G 3/22
USPC .... 310/71, 89; 174/152 G, 153 G, 650, 654, 174/659, 668
IPC ...................................................... H02K 5/10
See application file for complete search history.

(56) References Cited

U.S. PATENT DOCUMENTS

| | | | | |
|---|---|---|---|---|
| 4,709,124 A | * | 11/1987 | Wheeler | ............... H02G 15/013 174/668 |
| 5,414,318 A | * | 5/1995 | Shimizu | ................. H01R 39/38 310/239 |
| 6,051,794 A | * | 4/2000 | Katou | ................. B60R 16/0222 174/151 |

(Continued)

FOREIGN PATENT DOCUMENTS

| | | |
|---|---|---|
| JP | 51-26305 B2 | 8/1976 |
| JP | 7-36567 U | 7/1995 |

(Continued)

OTHER PUBLICATIONS

Official Communication issued in corresponding Japanese Patent Application No. 2012-173394, mailed on Apr. 20, 2016.

*Primary Examiner* — John K Kim
(74) *Attorney, Agent, or Firm* — Keating & Bennett, LLP (57) ABSTRACT

A rotary electric machine includes a rotor, a stator, a circuit substrate, a tubular closed-top and closed-bottom motor case arranged to accommodate the rotor, and bearings. The motor case is axially divided into a first casing and a second casing. Each of a first and a second tap portion of the first and the second casings includes an inner circumferential surface and at least one groove arranged on the inner circumferential surface. A lead bush includes a through-hole arranged to guide a lead wire and at least three annular bulging portions arranged at a specified interval along an outer circumferential surface of the lead bush. A middle annular bulging portion of the three annular bulging portions is fitted to the groove of each of the first tap portion and the second tap portion so that the lead bush is gripped between the first tap portion and the second tap portion.

11 Claims, 6 Drawing Sheets

(56) References Cited

U.S. PATENT DOCUMENTS

| | | | | |
|---|---|---|---|---|
| 6,417,588 B2* | 7/2002 | Niimi | H01R 39/383 | 310/249 |
| 7,834,497 B2* | 11/2010 | Utsunomiya | F02N 15/067 | 290/38 R |
| 8,410,649 B2* | 4/2013 | Tanabe | H01R 12/707 | 310/71 |
| 2002/0033269 A1* | 3/2002 | Gust | H02G 3/0468 | 174/539 |
| 2008/0048517 A1* | 2/2008 | Ochiai | H02K 1/278 | 310/216.004 |
| 2014/0035405 A1* | 2/2014 | Mao | H02K 5/225 | 310/71 |

FOREIGN PATENT DOCUMENTS

| | | |
|---|---|---|
| JP | 10-019446 A | 1/1998 |
| JP | 10-304640 A | 11/1998 |
| JP | 2002-95207 A | 3/2002 |
| JP | 2004-147467 A | 5/2004 |
| JP | 2008-259370 A | 10/2008 |
| JP | 2010-287454 A | 12/2010 |

* cited by examiner

ROTARY ELECTRIC MACHINE

BACKGROUND OF THE INVENTION

1. Field of the Invention

The present invention relates to a rotary electric machine, and more specifically, to a brushless motor desirably used as a fan motor in a freezing/refrigerating showcase or a refrigerator.

2. Description of the Related Art

In a freezing/refrigerating showcase such as an open showcase or the like, as can be seen in, e.g., Japanese Patent Application Publication No. H10-019446, a machine room in which a freezer and a fan are arranged is provided on a bottom portion of a showcase body. Above the machine room, there is provided an open-front showroom in which product display shelves are arranged in multiple stages. Cold air generated in the freezer is fed to a circulating duct by a fan and is blown from the upper portion of the showroom toward a front opening, thereby forming an air curtain for keeping the products displayed on the product display shelves cold.

In this showcase, a cold air circulating fan is arranged under an environment in which dew condensation easily is generated due to a temperature difference. For that reason, a motor for rotating fan blades needs to employ a waterproof structure. Conventionally, as can be noted in, e.g., Japanese Patent Application Publications No. H10-304640 and 2008-259370, a motor case is divided into two casings. A sealing means such as an O-ring or the like is interposed between the mating surfaces of the divided casings. As a waterproofing means for lead wires led out from a motor, a grommet is mounted to a lead wire outlet formed in the motor case. The lead wires are drawn out through the grommet.

In the conventional waterproof structure for a motor, as set forth above, the motor case is divided into two casings and the sealing means is interposed between the mating surfaces of the divided casings. However, the mating surfaces for holding the sealing means in place become structurally complex. Moreover, it is hard to say that a sufficient waterproof measure is taken with respect to the portions other than the mating surfaces. Thus, a demand exists for improvement. Particularly, in Japanese Patent Application Publication No. H10-304640, the motor case is provided with a drain hole and a cutoff wall. However, this structure is not capable of reliably preventing infiltration of moisture. In Japanese Patent Application Publication No. 2008-259370, there is disclosed a structure in which a groove-shaped mounting portion is formed in a lead wire outlet portion of a motor case and in which an outer circumferential portion of a grommet is fitted to the groove-shaped mounting portion. However, it is likely that a dimensional error may be generated in the groove-shaped mounting portion of the lead wire outlet portion or a gap may be generated between the lead wire outlet portion and the grommet due to a degradation of the grommet over time. This poses a problem in that the waterproof effect becomes lower.

SUMMARY OF THE INVENTION

Preferred embodiments of the present invention provide a rotary electric machine which can be suitably used under an environment in which dew condensation is easily generated due to a temperature difference or at an easy-to-wet place and which can enhance a waterproof property with a simple configuration.

In accordance with a preferred embodiment of the present invention, there is provided a rotary electric machine, including a rotor including a shaft and a magnet; a stator concentrically arranged with respect to the rotor, the stator including a stator core and a coil wound around the stator core; a circuit substrate including a control circuit configured to control an electric current to be supplied to the coil; a tubular closed-top and closed-bottom motor case arranged to accommodate the rotor, the stator and the circuit substrate; and bearings arranged in the motor case to rotatably support the shaft of the rotor, wherein the motor case is axially divided into a first casing and a second casing, the first casing including a cover portion, a first side portion extending axially downward from the cover portion, a first peripheral wall portion defined in the first side portion, and a substantially semi-tubular first tap portion formed in a portion of the first side portion, the second casing including a bottom portion, a second side portion extending axially upward from the bottom portion, a second peripheral wall portion defined in the second side portion and fitted to the first peripheral wall portion, and a substantially semi-tubular second tap portion defined in a portion of the second side portion and arranged to face the first tap portion to define a hole portion in which a lead bush is mounted, each of the first tap portion and the second tap portion including an inner circumferential surface and at least one groove arranged on an inner circumferential surface, the lead bush including a through-hole arranged to guide a lead wire connected to the circuit substrate and at least three annular bulging portions arranged at a specified interval along an outer circumferential surface of the lead bush, a middle annular bulging portion of the three annular bulging portions being fitted to the groove of each of the first tap portion and the second tap portion so that the lead bush is gripped between the first tap portion and the second tap portion.

With such a configuration, the mating surfaces of the first and second casings are sealed by fitting the first and second peripheral wall portions of the first and second casings making up the tubular motor case to each other. The first and second tap portions arranged in the first and second side portions of the first and second casings face each other and grip the lead bush through which the lead wire extends. At this time, the middle annular bulging portion of the three annular bulging portions of the lead bush is fitted to the grooves of the inner circumferential surfaces of the first and second tap portions. The outer circumferential surfaces of the lead bush existing at the opposite sides of the middle annular bulging portion are externally compressed by the inner circumferential surfaces of the first and second tap portions. This makes it possible to provide sealing between the lead bush and the first and second tap portions. At the same time, the expansion of the annular bulging portions caused by the contraction of the lead bush is accommodated by the grooves of the first and second tap portions. It is therefore possible to secure sealing in that portion, and to provide double and triple sealing actions. This makes it possible to enhance sealing between the inner surfaces of the tap portions and the lead bush. As a result, even if an error exists in the dimension of the tap portions of the casings and in the dimension of the lead bush or even if the lead bush is degraded over time, the sealing function of the lead wire outlet portion is stably maintained for a prolonged period of time.

The above and other elements, features, steps, characteristics and advantages of the present invention will become more apparent from the following detailed description of preferred embodiments of the present invention made with reference to the attached drawings. The accompanying drawings are presented merely for the sake of illustration and are not intended to limit the present invention.

DETAILED DESCRIPTION OF THE PREFERRED EMBODIMENTS

Preferred embodiments of the present invention will now be described with reference to the accompanying drawings.

First Preferred Embodiment

Figure 1:
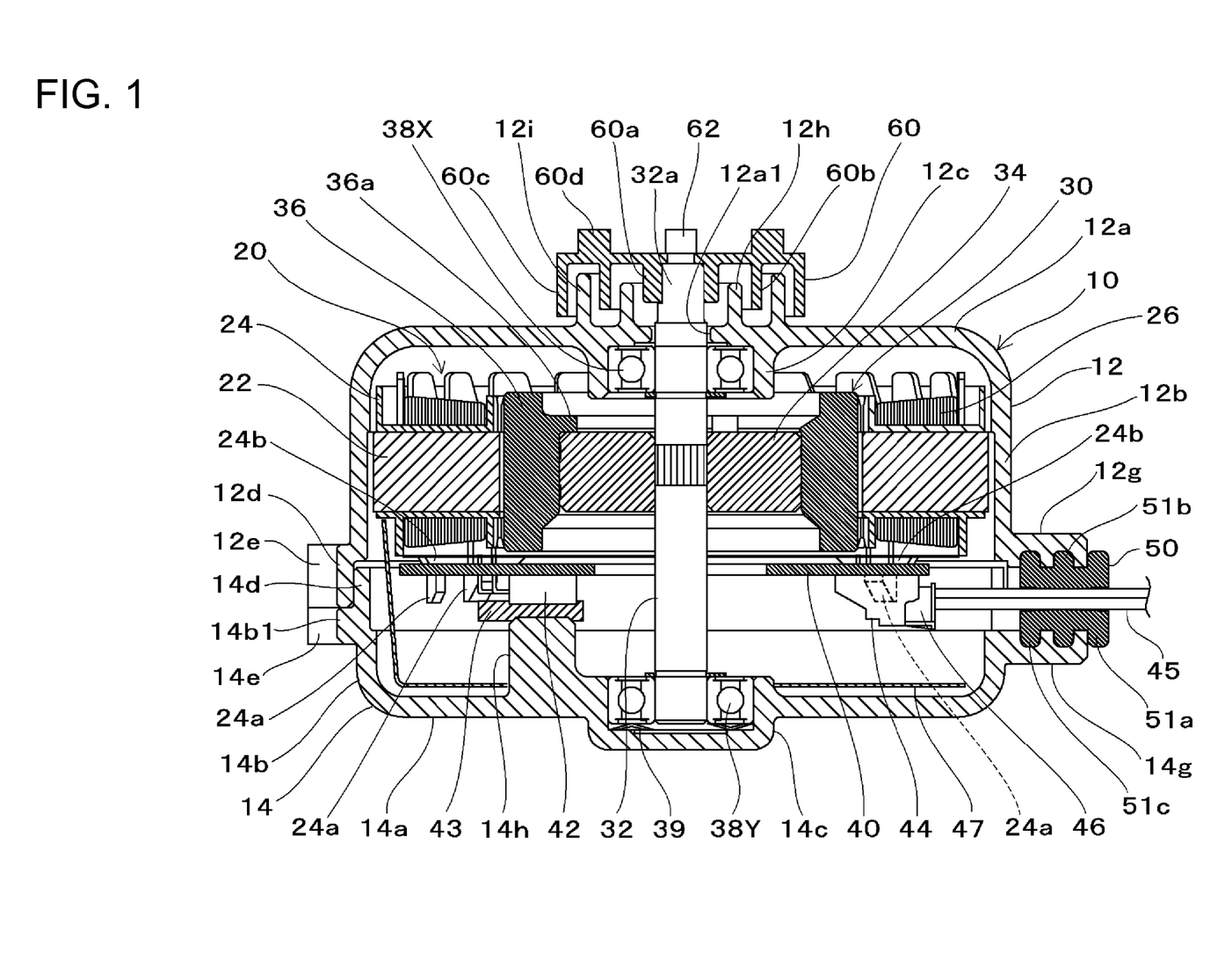
FIG. 1 is a sectional side view showing a rotary electric machine according to a first preferred embodiment of the present invention.
Figure 2:
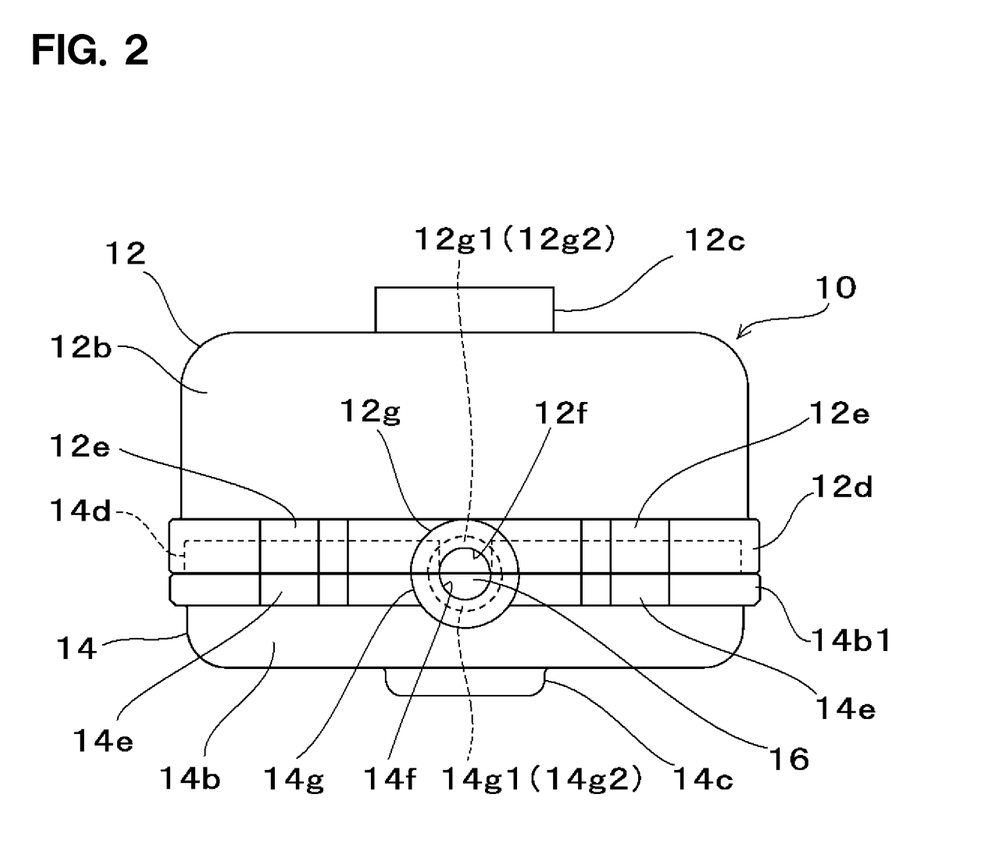
FIG. 2 is a front view of the rotary electric machine shown in FIG. 1.
Figure 3:
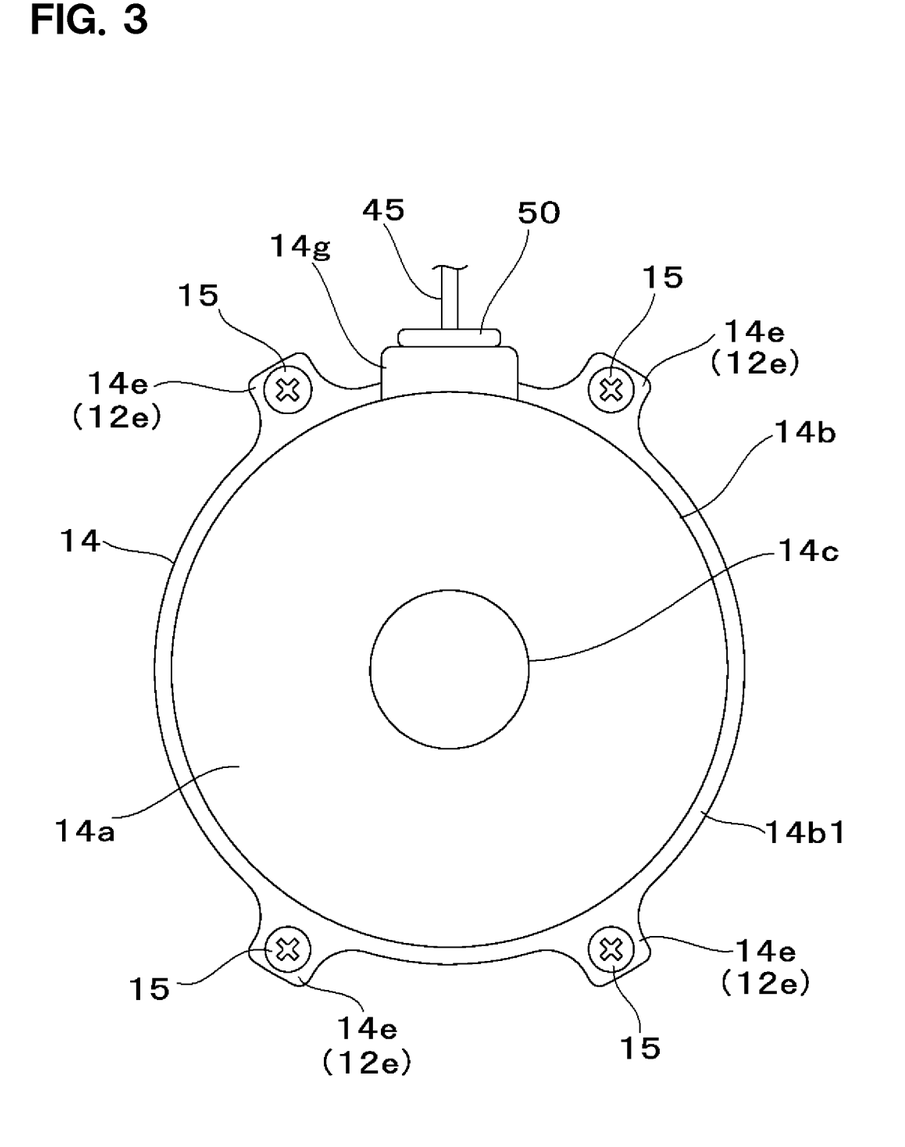
FIG. 3 is a bottom view of the rotary electric machine shown in FIG. 1.

FIG. 1 shows the internal configuration of a rotary electric machine according to a first preferred embodiment of the present invention. FIG. 2 is a front view of the rotary electric machine. FIG. 3 is a bottom view of the rotary electric machine. A motor case 10 defining an outer surface of the rotary electric machine preferably has a cylindrical or substantially cylindrical shape with a closed-top and a closed-bottom. The motor case 10 is divided into two pieces at an axial center position or a substantially axial center position and is preferably defined by a first casing 12 including a cover portion 12a and a second casing 14 including a bottom portion 14a. The first casing 12 and the second casing 14 are preferably formed by, e.g., aluminum die-casting. FIG. 2 depicts a state in which the first casing 12 and the second casing 14 are combined together. A lead bush and a shaft to be described later are not shown in FIG. 2.

The first casing 12 preferably has an open-bottom cup shape including a circular cover portion 12a and a cylindrical side portion 12b extending axially downward from the peripheral edge of the cover portion 12a. A shaft-insertion opening 12a1 is preferably arranged at the center of the cover portion 12a. A cylindrical bearing-holding boss portion 12c protrudes downward from the central region of the cover portion 12a to surround the shaft-insertion opening 12a1. A recess portion opened into the first casing 12 is defined by the bearing-holding boss portion 12c. An outer peripheral wall portion 12d is preferably connected to the lower end of the side portion 12b through a step by which inner and outer diameters of the outer peripheral wall portion 12d are respectively larger than those of the side portion 12b. The second casing 14 preferably has an open-top cup shape including a circular bottom portion 14a and a cylindrical side portion 14b extending axially upward from the peripheral edge of the bottom portion 14a. A bearing-holding boss portion 14c bulging downward is defined in the central region of the bottom portion 14a. A recess portion opened into the second casing 14 is preferably defined by the bearing-holding boss portion 14c. An inner peripheral wall portion 14d to be fitted inside the outer peripheral wall portion 12d of the first casing 12 is preferably defined in the upper peripheral edge of the side portion 14b.

The first casing 12 and the second casing 14 are interconnected by fitting the inner peripheral wall portion 14d of the second casing 14 to the outer peripheral wall portion 12d of the first casing 12. A step-shaped annular thick portion 14b1 serving as an annular stopper is preferably a one-piece member that is integral and formed together with the side portion 14b of the second casing 14 as a single monolithic member and is arranged below the inner peripheral wall portion 14d. The annular thick portion 14b1 is preferably equal or substantially equal in outer diameter to the outer peripheral wall portion 12d of the first casing 12. When the outer peripheral wall portion 12d and the inner peripheral wall portion 14d are fitted to each other, the lower end surface of the outer peripheral wall portion 12d makes contact with the upper surface of the annular thick portion 14b1, such that the first casing 12 and the second casing are axially located in position. In addition, the sealing property in the fitting region of the first casing 12 and the second casing 14 is enhanced because the outer peripheral wall portion 12d of the first casing 12 is fitted to the outer surface of the inner peripheral wall portion 14d of the second casing 14 and because the lower end surface of the outer peripheral wall portion 12d makes contact with the upper surface of the annular thick portion 14b1.

As shown in FIGS. 2 and 3, a plurality of (preferably four, as depicted in the illustrated example) fixing pieces 12e protruding radially outward is arranged around a mating surface, i.e., an opening edge, of the first casing 12. Similarly, a plurality of (preferably four, as depicted in the illustrated example) fixing pieces 14e protruding radially outward is arranged around a mating surface, i.e., an opening edge, of the second casing 14. The fixing pieces 12e are axially opposed to the fixing pieces 14e. The fixing pieces 12e are arranged in a circumferentially spaced-apart relationship with one another. Likewise, the fixing pieces 14e are arranged in a circumferentially spaced-apart relationship with one another. The fixing pieces 12e of the first casing 12 are arranged substantially in the same axial position as the outer peripheral wall portion 12d. The fixing pieces 14e of the second casing 14 are preferably arranged in or substantially in the same axial position as the annular thick portion 14b1. When the outer peripheral wall portion 12d of the first casing 12 and the inner peripheral wall portion 14d of the second casing 14 are fitted to each other, the fixing pieces 12e of the first casing 12 axially overlap with the fixing pieces 14e of the second casing 14. In this regard, the fixing pieces 12e and 14e are arranged in alignment with the mounting positions in which the motor is attached to a device. For example, the fixing pieces 12e and 14e are preferably arranged in the positions oppositely spaced apart about 30 degrees from front surface center and in the positions oppositely spaced apart about 30 degrees from the rear surface center.

Since the fixing pieces 12e of the first casing 12 overlap with the fixing pieces 14e of the second casing 14, the fixing pieces 12e are not shown in FIG. 3. For the sake of convenience, the fixing pieces 12e are indicated to exist in the positions of the fixing pieces 14e. Fastening holes are preferably defined in the respective fixing pieces 12e and 14e. The fastening holes of the fixing pieces 12e of the first casing 12 are preferably thread holes, for example. The fastening holes of the fixing pieces 14e of the first casing 14 are preferably screw insertion holes, for example. As shown in FIG. 3, screws 15 are respectively inserted through the screw insertion holes of the fixing pieces 14e from the lower side of the second casing 14 and are threaddedly coupled to the thread holes of the fixing pieces 12e of the first casing 12, such that the fixing pieces 12e and 14e are firmly tightened together and the casings 12 and 14 are combined together.

Tap portions 12g and 14g including concave portions 12f and 14f facing each other to define a lead bush mounting hole 16 are arranged in a region (front central region) of the outer peripheral wall portion 12d of the first casing 12 and in a region (front central region) of the annular thick portion 14b1 of the second casing 14. Each of the tap portions 12g and 14g preferably has a semi-cylindrical or substantially semi-cylindrical shape. Each of the tap portions 12g and 14g protrude forward from a middle position between the fixing pieces 12e or the fixing pieces 14e arranged at the front side of the motor case 10. The lower surface of the tap portion 12g of the first casing 12 is preferably flush with the lower end surface of the outer peripheral wall portion 12d. The upper surface of the tap portion 14g of the second casing 14 is preferably flush with the upper surface of the annular thick portion 14b1. If the lower end surface of the outer peripheral wall portion 12d is brought into contact with the upper surface of the annular thick portion 14b1 by combining the casings 12 and 14 together as mentioned above, the mating surfaces of the tap portions 12g and 14g come into contact with each other, so as to define a cylindrical tap portion.

As shown in FIG. 1, a stator 20 and a rotor 30, both of which together define an inner-rotor-type motor, are arranged within the motor case 10. The stator 20 preferably includes an annular stator core 22 which is preferably formed by, for example, laminating a plurality of magnetic steel plates one above another and configured such that a plurality of salient pole portions arranged at a regular interval along a circumferential direction protrudes radially inward from an annular core-back portion, an insulator 24 covering the peripheral surfaces of the stator core 22 except the outer circumferential surface of the stator core 22 and the end surfaces of the respective salient pole portions, and three-phase coils 26 wound around the respective salient pole portions through the insulator 24. The insulator 24 is preferably defined by, e.g., an insert-molded body one-piece member that is molded with the stator core 22. The insulator 24 is configured to cover the peripheral surfaces of the respective salient pole portions with bobbin-shaped covering portions which are annularly connected to one another at the outer circumferential ends thereof. A plurality of substrate-holding claw pieces 24a and a plurality of pressing pieces 24b arranged near the claw pieces 24a preferably protrude downward from the lower peripheral wall of the insulator 24. The claw pieces 24a and the pressing pieces 24b are respectively arranged at a regular or substantially regular interval along the circumferential direction. The stator 20 is fixed to the first casing 12 by fitting the outer circumferential surface of the stator core 22 to the inner surface of the side portion 12b of the first casing 12. As a specific structure or method of fixing the stator core 22 to the first casing 12, it may be possible to use, for example, an adhesive agent, a press-fitting method, or a shrink-fitting method. Also, the insulator 24 need not necessarily be a one-piece member molded with the stator core 22 but may alternatively be of a type which is fitted to the stator core 22 at the axial opposite sides thereof so as to cover the stator core 22.

The rotor 30 arranged inside the stator 20 preferably includes a shaft 32, an aluminum-made rotor core 34 fitted, e.g., by press-fitting, to a middle knurled portion of the shaft 32, and a cylindrical rotor magnet 36 preferably, e.g., fitted to and adhesively fixed to the outer circumference of the rotor core 34. The rotor magnet 36 is preferably defined by, e.g., a ferrite plastic magnet. Locating projections 36a are preferably a one-piece member molded with the rotor magnet 36 in a plurality of positions of the upper region of the inner circumference of the rotor magnet 36. The rotor core 34 and the rotor magnet 36 are axially aligned with each other by bringing the end surface of the rotor core 34 into contact with the locating projections 36a.

The shaft 32 preferably includes an upper end portion serving as an output shaft portion 32a which has been subjected to cutting such that it includes at least one removed portion to substantially define a shape of, for example, the letter "D". The output shaft portion 32a protrudes outward beyond an opening 12a1 of the cover portion 12a of the first casing 12. The shaft includes a portion positioned just below the output shaft portion 32a and rotatably supported by an upper bearing 38X held inside the bearing-holding boss portion 12c. The shaft 32 includes a lower end portion rotatably supported by a lower bearing 38Y held inside the recess portion of the bearing-holding boss portion 14c of the second casing 14. Thus, the rotor 30 is rotatably supported on the motor case 10. A wave washer 39 is preferably arranged on the bottom of the recess portion of the bearing-holding boss portion 14c, so as to apply an axial pre-load force to the bearings 38X and 38Y.

An annular circuit substrate 40 attached through the use of the claw pieces 24a and the pressing pieces 24b of the insulator 24 is preferably arranged just below the stator 20. More specifically, the circuit substrate 40 is attached by bringing the upper surface of the circuit substrate 40 into contact with the pressing pieces 24b and then locking the tip end claws of the claw pieces 24a to the peripheral lower surface of the circuit substrate 40. The circuit substrate 40 is preferably equipped with a converter circuit which converts an alternating current supplied from the outside into a direct current, a driver circuit arranged to supply the direct current to the three-phase coils, and a control circuit which controls the operations of the coils pursuant to a control signal supplied from the outside. Electronic components defining these circuits are preferably mostly mounted to the lower surface of the circuit substrate 40. The electronic components other than a heat-generating power element 42 are not shown in FIG. 1. The coil terminals of the three-phase coils 26 of the stator 20 are connected to the circuit substrate 40.

A projection portion 14h protruding to near the power element 42 is preferably a one-piece member integral with the upper surface of the bottom portion 14a of the second casing 14 in a position corresponding to the power element 42. A heat dissipating sheet 43 having a relatively large thickness as compared to the thickness of the circuit board 40 is interposed between the projection portion 14h and the power element 42. The heat generated in the power element 42 is transferred to the projection portion 14h through the heat dissipating sheet 43. This makes it possible to smoothly dissipate heat through the entire region of the second casing 14. A substrate-side connector 44 is preferably attached to the front lower surface of the circuit substrate 40. A tap-side connector 46 of lead wires leading to an external device is preferably removably connected to the substrate-side connector 44. An insulating sheet 47 is arranged inside the second casing 14 in a corresponding relationship with the circuit substrate 40, so as to insulate the second casing 14.

The lead wires 45 preferably include lead wires connected to two AC power lines and lead wires connected to several control signal lines.

Figure 4:
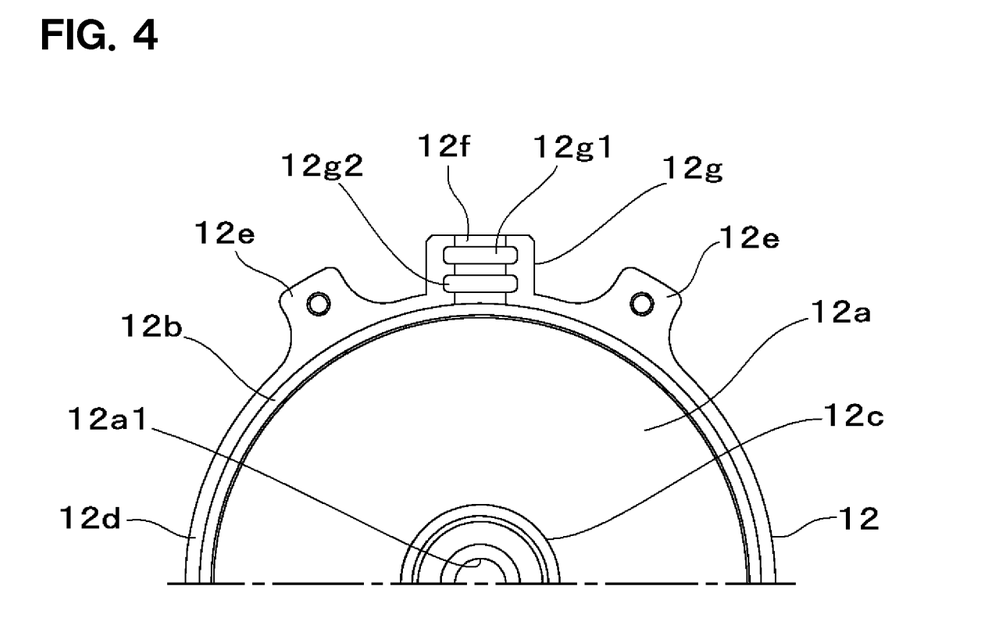
FIG. 4 is a bottom view showing a portion of a first casing of the rotary electric machine shown in FIG. 1.
Figure 5:
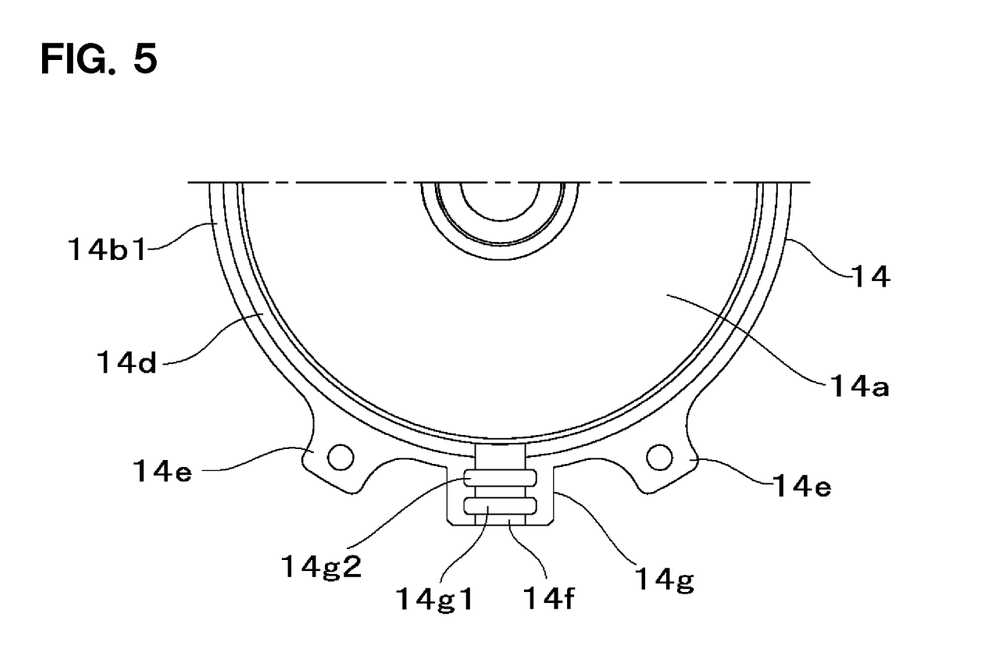
FIG. 5 is a top view showing a portion of a second casing of the rotary electric machine shown in FIG. 1.

A synthetic-rubber-made tubular lead bush 50 through which the lead wires 45 extend is preferably gripped between the tap portions 12g and 14g of the first and second casings 12 and 14. As shown in FIGS. 4 and 5, two sets of grooves 12g1, 12g2, 14g1, and 14g2 are preferably defined in the respective tap portions 12g and 14g at a specified interval along the inner circumferential surfaces of the tap portions 12g and 14g in the mutually facing positions. A through-hole through which the lead wires 45 extend is defined at the center of the lead bush 50. Three annular bulging portions 51a, 51b, and 51c bulging radially outward are preferably defined on the outer circumferential surface of the lead bush 50 at or substantially at the same interval as the interval of the grooves 12g1, 12g2, 14g1, and 14g2. In this regard, the diameter of the inner circumferential surfaces of the tap portions 12g and 14g is preferably set slightly smaller than the diameter of the outer circumferential surfaces of the lead bush 50 existing between the annular bulging portions 51a, 51b, and 51c. The depth of the grooves 12g1, 12g2, 14g1, and 14g2 of the tap portions 12g and 14g is preferably set equal or substantially equal to or slightly larger than the bulging dimension of the annular bulging portions 51a, 51b, and 51c of the lead bush 50.

When the first and second casings 12 and 14 are combined together as shown in FIG. 1, the annular bulging portions 51b and 51c of the lead bush 50 are respectively inserted into the grooves 12g1 and 14g1 and the grooves 12g2 and 14g2 of the tap portions 12g and 14g, in which state the lead bush 50 is gripped between the tap portions 12g and 14g. At this time, the inner circumferential surfaces of the tap portions 12g and 14g act to press the outer circumferential surfaces of the lead bush 50 existing between the annular bulging portions 51a, 51b and 51c from outside. Thus, the through-hole of the lead bush 50 is contracted to eliminate or substantially eliminate a gap between the lead wires 45 and the lead bush 50, consequently securing air-tightness. Sealing is performed at two points between the inner circumferential surfaces of the tap portions 12g and 14g and the outer circumferential surface of the lead bush 50. If the outer circumferential surface of the lead bush 50 is compressed by the inner circumferential surfaces of the tap portions 12g and 14g, the deforming force of the lead bush 50 acts to enlarge the annular bulging portions 51a, 51b, and 51c. The annular bulging portion 51a arranged at the front end of the lead bush 50 makes close contact with the front end surfaces of the tap portions 12g and 14g. The remaining annular bulging portions 51b and 51c are preferably deeply and/or strongly fitted to the grooves 12g1 and 14g1 and the grooves 12g2 and 14g2 by the compressing force. This increases adhesion between the lead bush 50 and the tap portions 12g and 14g. As a result, the sealing in the tap portions 12g and 14g is significantly enhanced.

Two annular sealing walls 12h and 12i protruding upward are defined by a one-piece member integral and formed with the cover portion 12a of the first casing 12 about the opening 12a1 so as to surround the opening 12a1. The annular sealing walls 12h and 12i are concentric with the opening 12a1. The outer annular sealing wall 12i is preferably arranged higher than the inner annular sealing wall 12h. A sealing cap 60 is preferably attached to the output shaft portion 32a of the shaft 32 by virtue of, for example, a screw 62. The sealing cap 60 preferably includes a base including a boss portion 60a and two cylindrical walls 60b and 60c differing in diameter from each other. The cylindrical walls 60b and 60c are concentrically arranged about the boss portion 60a. The boss portion 60a and the cylindrical walls 60b and 60c extend downward. The boss portion 60a is arranged inside the annular sealing wall 12h and is fitted to the output shaft portion 32a. The inner cylindrical wall 60b is preferably loosely fitted to between the annular sealing walls 12h and 12i from above. The outer cylindrical wall 60c is preferably loosely fitted to the outer side of the annular sealing wall 12i from above. Small gaps are defined between the boss portion 60a and the cylindrical walls 60b and 60c of the sealing cap 60 and the annular sealing walls 12h and 12i of the cover portion 12a, so as to provide a so-called staggering labyrinth structure which serves to seal the clearance between the opening 12a1 and the shaft 32.

The downward protruding dimension of the sealing cap 60 is preferably set to increase in size radially outward in the order of the inner boss portion 60a, the middle cylindrical wall 60b, and the outer cylindrical wall 60c. As stated above, the protruding height of the annular sealing walls 12h and 12i of the cover portion 12a is also preferably set to grow larger radially outward. For that reason, the fit depth of the annular sealing walls 12h and 12i and the cylindrical walls 60b and 60c becomes larger radially outward. As a result, an effect of preventing water from infiltrating into the motor is provided. This helps enhance waterproof and rainproof actions. A plurality of protrusions 60d (which are preferably, for example, used as detents when attaching a rotary load to the sealing cap 60) is arranged on the upper surface of the sealing cap 60. The rotary load and the sealing cap 60 are preferably fixedly secured to the shaft 32 by virtue of the screw 62. Instead of preparing the sealing cap 60 as an independent component, the sealing cap 60 may alternatively be a one-piece structure integral and formed together with the rotary load which is connected to the shaft 32.

In case where the rotary electric machine of the aforementioned preferred embodiment is used as a drive motor of a cold air circulating fan in an open showcase, a propeller as a rotary load as well as the sealing cap 60 is preferably connected to the output shaft portion 32a of the shaft 32 protruding from the motor case 10. For example, a shroud covering the propeller is attached to the motor case 10 by the screws 15 which are used in fastening the fixing pieces 12e (14e). The motor is attached to a device through the shroud or by the screws 15 together with the shroud. Due to the use environment, a waterproof property is required in the cold air circulating fan. As set forth above, the first and second casings 12 and 14 making up the motor case 10 are preferably air-tightly fitted to each other in the inner peripheral wall portion 14d and the outer peripheral wall portion 12d. As described above in detail, the outlet portion of the lead wires 45 is reliably sealed by the structure in which the lead bush 50 is gripped by the tap portions 12g and 14g. The opening 12a1 of the first casing 12 through which a portion of the shaft 32 protrudes is sealed by the labyrinth seal defined by the annular sealing walls 12h and 12i of the cover portion 12a and the sealing cap 60. Accordingly, it is possible to secure a waterproof property.

Second Preferred Embodiment

Figure 6:
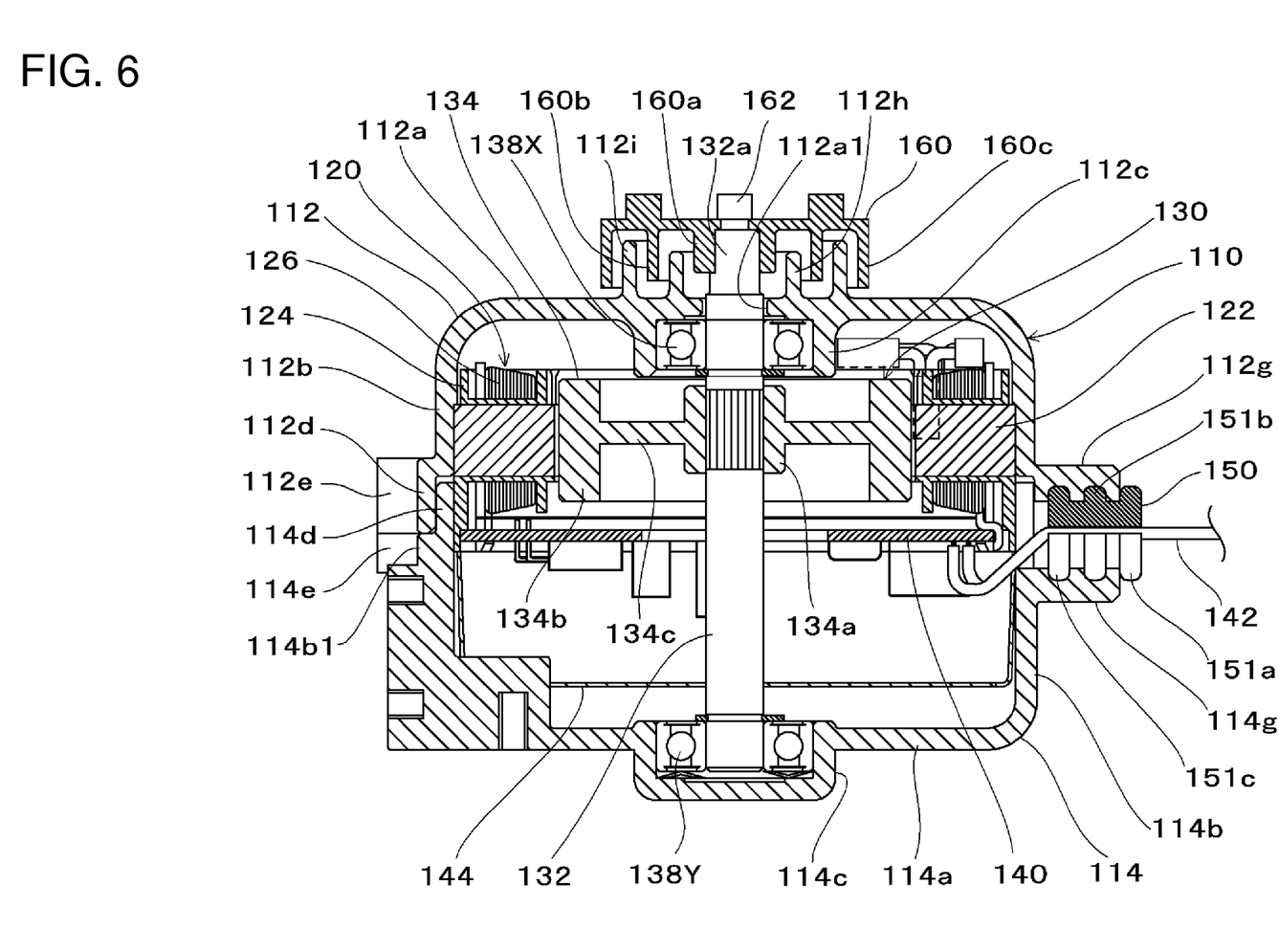
FIG. 6 is a sectional side view showing a rotary electric machine according to a second preferred embodiment of the present invention.

FIG. 6 shows the internal configuration of a rotary electric machine according to a second preferred embodiment of the present invention. In this preferred embodiment, just like the first preferred embodiment, a closed-top and closed-bottom tubular motor case 110 is preferably divided into two pieces and is defined by a first casing 112 and a second casing 114. Particularly, the size of a motor is reduced by reducing the outer diameter thereof. The motor case 110 is axially bisected by the first casing 112 including a cover portion 112*a* and the second casing 114 including a bottom portion 114*a*. The first casing 112 and the second casing 114 are preferably formed by, e.g., aluminum die-casting.

The first casing 112 preferably has an open-bottom cup shape by a circular cover portion 112*a* and a cylindrical side portion 112*b* extending axially downward from the peripheral edge of the cover portion 112*a*. A shaft-insertion opening 112*a*1 is preferably defined at the center of the cover portion 112*a*. A cylindrical bearing-holding boss portion 112*c* protrudes downward from the central region of the cover portion 112*a* so as to surround the shaft-insertion opening 112*a*1. A recess portion opened into the first casing 112 is defined by the bearing-holding boss portion 112*c*. An outer peripheral wall portion 112*d* is connected to the lower end of the side portion 112*b* through a step by which inner and outer diameters of the outer peripheral wall portion 112*d* are respectively made larger than those of the side portion 112*b*. The second casing 114 preferably has an open-top cup shape by a circular bottom portion 114*a* and a cylindrical side portion 114*b* extending axially upward from the peripheral edge of the bottom portion 114*a*. A bearing-holding boss portion 114*c* bulging downward is preferably arranged in the central region of the bottom portion 114*a*. A recess portion opened into the second casing 114 is defined by the bearing-holding boss portion 114*c*. An inner peripheral wall portion 114*d* to be fitted inside the outer peripheral wall portion 112*d* of the first casing 112 is preferably defined in the upper peripheral edge of the side portion 114*b*.

The first casing 112 and the second casing 114 are interconnected by fitting the inner peripheral wall portion 114*d* of the second casing 114 to the outer peripheral wall portion 112*d* of the first casing 112. A step-shaped annular thick portion 114*b*1 serving as an annular stopper is preferably a one-piece member integral and formed with the side portion 114*b* of the second casing 114 and is arranged below the inner peripheral wall portion 114*d*. The annular thick portion 114*b*1 is preferably equal or substantially equal in outer diameter to the outer peripheral wall portion 112*d* of the first casing 112. When the outer peripheral wall portion 112*d* and the inner peripheral wall portion 114*d* are fitted to each other, the lower end surface of the outer peripheral wall portion 112*d* makes contact with the upper surface of the annular thick portion 114*b*1, such that the first casing 112 and the second casing 114 are axially located in position.

A plurality of fixing pieces 112*e* protruding radially outward is preferably arranged around a mating surface, i.e., an opening edge, of the first casing 112. Similarly, a plurality of fixing pieces 114*e* protruding radially outward is arranged around a mating surface, i.e., an opening edge, of the second casing 114. The first casing 112 and the second casing 114 are preferably combined together by screw-fixing the fixing pieces 112*e* and 114*e*. Tap portions 112*g* and 114*g* including concave portions facing each other to define a lead bush mounting hole are arranged in a region (front central region) of the outer peripheral wall portion 112*d* of the first casing 112 and in a region (front central region) of the annular thick portion 114*b*1 of the second casing 114. Each of the tap portions 112*g* and 114*g* preferably has a semi-cylindrical or substantially semi-cylindrical shape. Each of the tap portions 112*g* and 114*g* protrudes forward from the front middle portion of the motor case 110. The lower surface of the tap portion 112*g* of the first casing 112 is preferably flush with the lower end surface of the outer peripheral wall portion 112*d*. The upper surface of the tap portion 114*g* of the second casing 114 is preferably flush with the upper surface of the annular thick portion 114*b*1. If the lower end surface of the outer peripheral wall portion 112*d* is brought into contact with the upper surface of the annular thick portion 114*b*1 by combining the casings 112 and 114 together as mentioned above, the mating surfaces of the tap portions 112*g* and 114*g* come into contact with each other, so as to define a cylindrical tap portion.

A stator 120 and a rotor 130, both of which together define an inner-rotor-type motor, are arranged within the motor case 110. As in the first preferred embodiment, the stator 120 preferably includes an annular stator core 122 including a plurality of salient pole portions arranged at a regular interval along a circumferential direction, an insulator 124 one-piece molded with the stator core 122, and three-phase coils 126 wound around the respective salient pole portions through the insulator 124. The stator 120 is preferably fixed to the first casing 112 by fitting the outer circumferential surface of the stator core 122 to the inner surface of the side portion 112*b* of the first casing 112.

The rotor 130 arranged inside the stator 120 preferably includes a shaft 132 and a rotor magnet 134 fixed to the intermediate portion of the shaft 132. The rotor magnet 134 is preferably made of, e.g., a ferrite plastic magnet. The rotor magnet 134 preferably includes an inner tube portion 134*a* fitted, e.g., by press-fitting, to the middle knurled portion of the shaft 132, an outer tube portion 134*b* facing the inner circumferential surface of the stator core 122 across an air gap, and a disk portion 134*c* interconnecting the inner tube portion 134*a* and the outer tube portion 134*b*. The inner tube portion 134*a*, the outer tube portion 134*b* and the disk portion 134*c* are preferably defined by a one-piece member integral and formed with one another. The outer tube portion 134*b* is magnetized in a specified manner such that a plurality of magnetic poles is provided along the circumferential direction. The shaft 132 preferably includes an upper end portion serving as an output shaft portion 132*a* which has been subjected to cutting such that it includes at least one removed portion to substantially define a shape of, for example, the letter "D". The output shaft portion 132*a* protrudes outward beyond an opening 112*a*1 of the cover portion 112*a* of the first casing 112. The shaft 132 includes a portion positioned just below the output shaft portion 132*a* and rotatably supported by an upper bearing 138X held in the recess portion of the bearing-holding boss portion 112*c*. The shaft 132 includes a lower end portion rotatably supported by a lower bearing 138Y held in the recess portion of the bearing-holding boss portion 114*c* of the second casing 114. Thus, the rotor 130 is rotatably supported on the motor case 110.

An annular circuit substrate 140 held by the insulator 124 is arranged just below the stator 120. The circuit substrate 140 is preferably equipped with a converter circuit which converts an alternating current supplied from the outside to a direct current, a driver circuit arranged to supply the direct current to the three-phase coils, and a control circuit arranged to control the operations of the coils pursuant to a control signal supplied from the outside. Electronic components defining these circuits are preferably mostly mounted to the lower surface of the circuit substrate 140. The coil terminals of the three-phase coils 126 of the stator 120 are preferably connected to the circuit substrate 140. Lead wires 142 connected to an external device are preferably directly soldered to the front lower surface of the circuit substrate 140. In the present preferred embodiment, the size of the circuit substrate 140 is preferably reduced in order to make the size of the rotary electric machine smaller than that of the first preferred embodiment. Thus, there is a limit in the spaces between the components mounted to the circuit substrate 140. For that reason, the lead wires 142 are directly connected to the circuit substrate 140, so as to make it unnecessary to use a connector. An insulating sheet 144 is preferably arranged inside the second casing 114 in a corresponding relationship with the circuit substrate 140.

A synthetic-rubber-made tubular lead bush 150 through which the lead wires 142 extend is gripped between the tap portions 112g and 114g of the first and second casings 112 and 114. As in the first preferred embodiment, two sets of grooves are defined in the respective tap portions 112g and 114g at a specified interval along the inner circumferential surfaces of the tap portions 112g and 114g in the mutually facing positions. A through-hole through which the lead wires 142 extend is preferably defined at the center of the lead bush 150. Three annular bulging portions 151a, 151b, and 151c bulging radially outward are preferably defined on the outer circumferential surface of the lead bush 150 at or substantially at the same interval as the interval of the grooves of the tap portions 112g and 114g. In this regard, the diameter of the inner circumferential surfaces of the tap portions 112g and 114g is preferably set slightly smaller than the diameter of the outer circumferential surfaces of the lead bush 150 existing between the annular bulging portions 151a, 151b, and 151c.

When the first and second casings 112 and 114 are combined together, the annular bulging portions 151b and 151c of the lead bush 150 are inserted into the grooves of the respective tap portions 112g and 114g, in which state the lead bush 150 is gripped between the tap portions 112g and 114g. At this time, the inner circumferential surfaces of the tap portions 112g and 114g act to press the outer circumferential surfaces of the lead bush 150 existing between the annular bulging portions 151a, 151b and 151c from outside. Thus, the through-hole of the lead bush 150 is contracted to eliminate or substantially eliminate a gap between the lead wires 142 and the lead bush 150, consequently securing air-tightness. Sealing is performed at two points between the inner circumferential surfaces of the tap portions 112g and 114g and the outer circumferential surface of the lead bush 150. If the outer circumferential surface of the lead bush 150 is compressed by the inner circumferential surfaces of the tap portions 112g and 114g, the deforming force of the lead bush 150 acts to enlarge the annular bulging portions 151a, 151b, and 151c. The annular bulging portion 151a existing at the front end of the lead bush 150 makes close contact with the front end surfaces of the tap portions 112g and 114g. The remaining annular bulging portions 151b and 151c are deeply or strongly fitted to the grooves by the compressing force. This increases adhesion between the lead bush 150 and the tap portions 112g and 114g. As a result, the sealing in the tap portions 112g and 114g is significantly enhanced.

Two annular sealing walls 112h and 112i protruding upward are preferably defined by a one-piece member integral and formed with the cover portion 112a of the first casing 112 about the opening 112a1 so as to surround the opening 112a1. The annular sealing walls 112h and 112i are concentric with the opening 112a1. The outer annular sealing wall 112i is preferably arranged higher than the inner annular sealing wall 112h. A sealing cap 160 is preferably attached to the output shaft portion 132a of the shaft 132 by virtue of, for example, a screw 162. The sealing cap 160 preferably includes a base including a boss portion 160a and two cylindrical walls 160b and 160c differing in diameter from each other. The cylindrical walls 160b and 160c are concentrically arranged about the boss portion 160a. Each of the boss portion 160a and the cylindrical walls 160b and 160c preferably has a downwardly-extending tubular shape. The boss portion 160a is fitted to the output shaft portion 132a. The inner cylindrical wall 160b is preferably loosely fitted to between the annular sealing walls 112h and 112i from above. The outer cylindrical wall 160c is preferably loosely fitted to the outer side of the annular sealing wall 112i from above. Small gaps are defined between the boss portion 160a and the cylindrical walls 160b and 160c of the sealing cap 160 and the annular sealing walls 112h and 112i of the cover portion 112a, so as to provide a so-called staggering labyrinth structure which serves to seal the clearance between the opening 112a1 and the shaft 132.

The downward protruding dimension of the sealing cap 160 is preferably set to increase radially outward in the order of the inner boss portion 160a, the middle cylindrical wall 160b, and the outer cylindrical wall 160c. The protruding height of the annular sealing walls 112h and 112i of the cover portion 112a is also preferably set to increase radially outward. As a result, there is provided an effect of preventing water from infiltrating into the motor. This helps enhance waterproof and rainproof actions.

Third Preferred Embodiment

Figure 7:
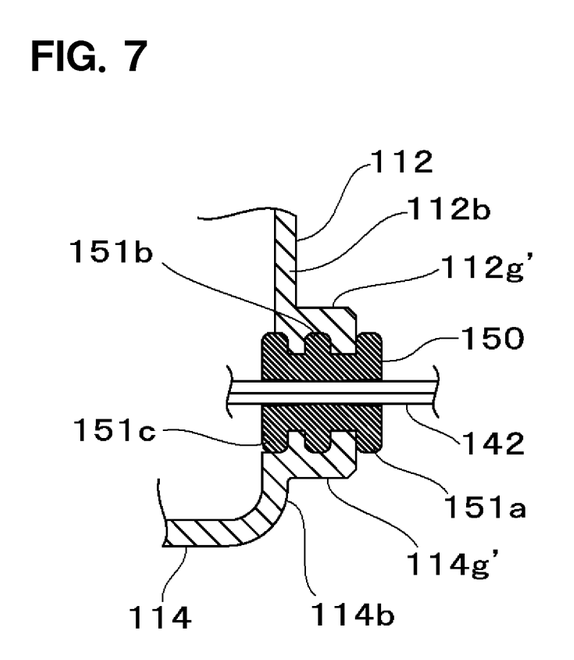
FIG. 7 is a partial sectional side view showing a lead wire outlet portion of a rotary electric machine according to a third preferred embodiment of the present invention.

FIG. 7 is a partially enlarged view showing a tap portion of a rotary electric machine according to a third preferred embodiment of the present invention. In FIG. 7, identical or equivalent components are designated by the same reference symbols as used in FIG. 6 which shows the rotary electric machine according to the second preferred embodiment. FIG. 7 differs from FIG. 6 in that the protruding length of tap portions 112g' and 114' defined in the side portions 112b and 114b of the first and second casings 112 and 114 is preferably made small in order to further reduce the size of the motor case.

More specifically, one set of grooves that accommodate a middle annular bulging portion 151b are located on the inner surfaces of a concave portions of the semi-cylindrical tap portions 112g' and 114' of the first and second casings 112 and 114. The outer circumferential surfaces of the lead bush 150 existing at the front and rear sides of the annular bulging portion 151b are gripped by the inner surfaces of the concave portions of the tap portions 112g' and 114' existing at the front and rear sides of the grooves. The annular bulging portion 151a existing at the front end of the lead bush 150 is preferably positioned at the front ends of the tap portions 112g' and 114'. The annular bulging portion 151c existing at the rear end of the lead bush 150 is arranged in pit portions which are defined at the base ends of the tap portions 112g' and 114' and opened into the motor case. The annular bulging portions 151a and 151c existing at the front and rear sides of the lead bush 150 are exposed at the front and rear ends of the tap portions 112g' and 114'. The protruding dimension of the tap portions 112g' and 114' is reduced by this structure.

In the present preferred embodiment, the diameter of the inner circumferential surfaces of the tap portions 112g' and 114g' is set slightly smaller than the diameter of the outer circumferential surface of the lead bush 150. When the first and second casings 112 and 114 are combined together, the outer circumferential surfaces of the lead bush 150 existing at the front and rear sides of the annular bulging portion 151b are compressed by the inner surfaces of the tap portions 112g' and 114g', so as to secure air-tightness in the interfaces. In addition, the deforming force of the lead bush 150 acts to enlarge the annular bulging portions 151a, 151b, and 151c. The middle annular bulging portion 151b of the lead bush 150 is deeply fitted to the grooves of the tap portions 112g' and 114g'. The remaining annular bulging portions 151a and 151c make close contact with the front and rear end surfaces of the tap portions 112g' and 114g', eventually increasing adhesion between the lead bush 150 and the tap portions 112g' and 114g'. As a result, the sealing in the tap portions 112g' and 114g' is significantly enhanced.

While certain preferred embodiments of the present invention have been described above, the present invention is not limited to these embodiments. Many different modifications and changes may be made without departing from the scope of the present invention.

What is claimed is:

1. A rotary electric machine, comprising:
a rotor including a shaft and a magnet;
a stator concentrically arranged with respect to the rotor, the stator including a stator core and a coil wound around the stator core;
a circuit substrate including a control circuit configured to control an electric current to be supplied to the coil;
a tubular closed-top and closed-bottom motor case arranged to accommodate the rotor, the stator and the circuit substrate; and
bearings arranged in the motor case to rotatably support the shaft of the rotor; wherein
the motor case is axially divided into a first casing and a second casing, the first casing including a cover portion, a first side portion extending axially downward from the cover portion, a first peripheral wall portion defined in the first side portion, and a semi-tubular or substantially semi-tubular first tap portion defined in a portion of the first side portion, the second casing including a bottom portion, a second side portion extending axially upward from the bottom portion, a second peripheral wall portion defined in the second side portion and fitted to the first peripheral wall portion and a semi-tubular or substantially semi-tubular second tap portion defined in a portion of the second side portion and arranged to face the first tap portion to define a hole portion in which a lead bush is mounted, each of the first tap portion and the second tap portion including an inner circumferential surface and at least one groove arranged on the inner circumferential surface, the lead bush including a through-hole arranged to guide a lead wire connected to the circuit substrate and at least three annular bulging portions arranged at a specified interval along an outer circumferential surface of the lead bush, a middle annular bulging portion of the three annular bulging portions being fitted to the groove of each of the first tap portion and the second tap portion so that the lead bush is gripped between the first tap portion and the second tap portion; and
the second peripheral wall portion includes a radially-bulging annular stopper portion axially facing an end surface of the first peripheral wall portion externally fitted to the second peripheral wall portion, the end surface of the first peripheral wall portion making contact with the annular stopper portion when the first casing and the second casing are combined together.

2. The machine of claim 1, wherein the hole portion defined by the first tap portion and the second tap portion has a dimension such that two outer circumferential surfaces of the lead bush interposing the middle annular bulging portion of the three annular bulging portions is compressed by the inner circumferential surfaces of the first tap portion and the second tap portion existing at opposite sides of the groove.

3. The machine of claim 2, wherein each of the first tap portion and the second tap portion has a semi-cylindrical shape, each of the first tap portion and the second tap portion having an inner diameter slightly smaller than an outer diameter of the outer circumferential surfaces of the lead bush.

4. The machine of claim 2, wherein the groove of each of the first tap portion and the second tap portion has a dimension equal to or larger than a dimension of the annular bulging portions of the lead bush.

5. The machine of claim 1, wherein, when the lead bush is gripped between the first tap portion and the second tap portion, the annular bulging portion existing at an outer end of the lead bush contacts with end surfaces of the first tap portion and the second tap portion.

6. The machine of claim 1, wherein the second peripheral wall portion of the second casing includes an inner peripheral wall portion defined in the second side portion, the first peripheral wall portion of the first casing including an outer peripheral wall portion defined in the first side portion and externally fitted to the inner peripheral wall portion.

7. The machine of claim 1, wherein the annular stopper portion has an outer diameter equal or substantially equal to an outer diameter of the first peripheral wall portion.

8. The machine of claim 1, wherein the cover portion of the first casing includes an opening through which the shaft of the rotor protrudes outward, the opening arranged such that a gap exists between an inner circumferential surface of the opening and an outer circumferential surface of the shaft.

9. The machine of claim 8, wherein the cover portion of the first casing includes an annular sealing wall protruding axially outward in a concentric relationship with the opening and surrounding the opening, and the machine further comprises a labyrinth sealing cap attached to the shaft protruding through the opening, the sealing cap including a cylindrical or substantially cylindrical wall fitted to at least one side of the annular sealing wall with a gap between the cylindrical wall and the annular sealing wall.

10. The machine of claim 9, wherein the annular sealing wall includes two or more annular sealing walls arranged in a concentric relationship with each other.

11. The machine of claim 9, wherein the labyrinth sealing cap is a one-piece member integral and formed with a rotary load which is connected to and rotated together with the shaft.

* * * * *